United States Patent [19]

Bremer, Jr.

[11] 3,945,269

[45] Mar. 23, 1976

[54] TORSIONAL VIBRATION DAMPER WITH INTERLEAF

[75] Inventor: Robert C. Bremer, Jr., Brownsburg, Ind.

[73] Assignee: Wallace Murray Corporation, New York, N.Y.

[22] Filed: Dec. 10, 1974

[21] Appl. No.: 531,349

[52] U.S. Cl. .................................. 74/574; 188/1 B
[51] Int. Cl.² ........................................ F16F 15/12
[58] Field of Search ...................... 74/574; 188/1 B

[56] References Cited
UNITED STATES PATENTS

| | | | |
|---|---|---|---|
| 1,928,763 | 10/1933 | Rosenberg | 74/574 X |
| 2,795,037 | 6/1957 | Haushalter | 74/574 X |
| 2,882,747 | 4/1959 | Haushalter | 74/574 |
| 2,972,904 | 2/1961 | Troyer | 74/574 |
| 2,992,569 | 7/1961 | Katzenberger | 74/574 |

*Primary Examiner*—Samuel Scott
*Assistant Examiner*—F. D. Shoemaker
*Attorney, Agent, or Firm*—Thomas J. Greer, Jr.

[57] ABSTRACT

A torsional vibration damper for internal combustion engines. An annular inertia member is attached to a hub by an annular elastic member assembly having an interleaf. In one embodiment, the interleaf is thicker at the middle than at its ends. In another embodiment the interleaf is thinner at its middle than at its ends. The elastomer is radially deformed at different axial portions. Axial movement of the inertia member relative to the hub is inhibited, as is sliding out of the elastomer from the inertia and hub members.

16 Claims, 10 Drawing Figures

FIG. 1
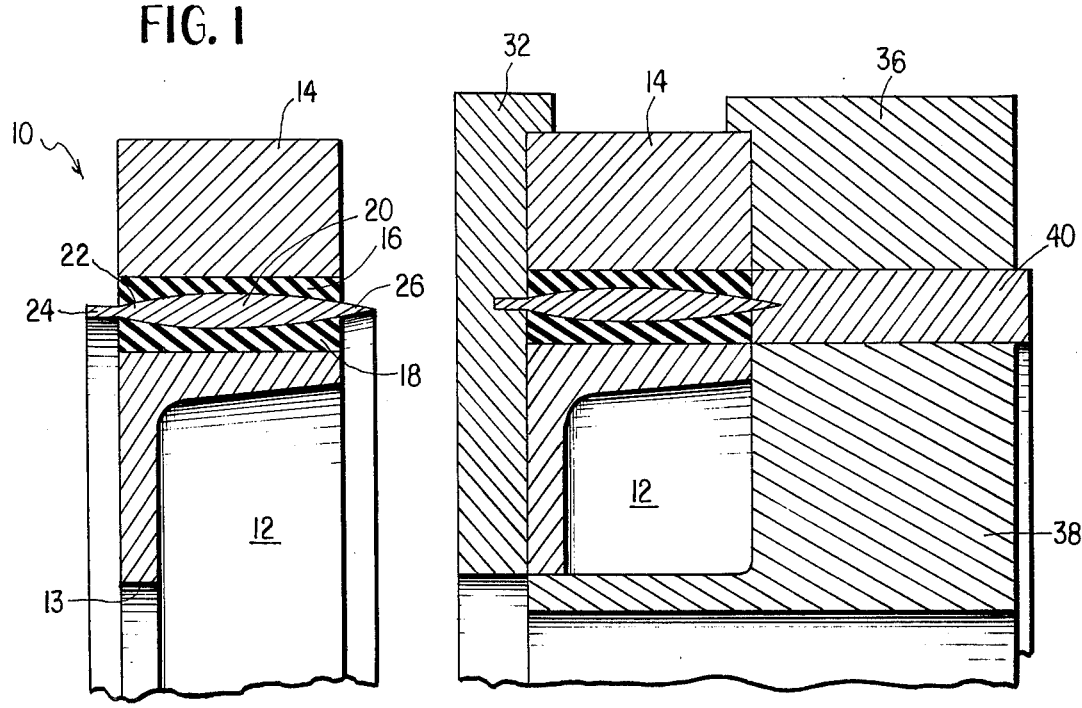
FIG. 3
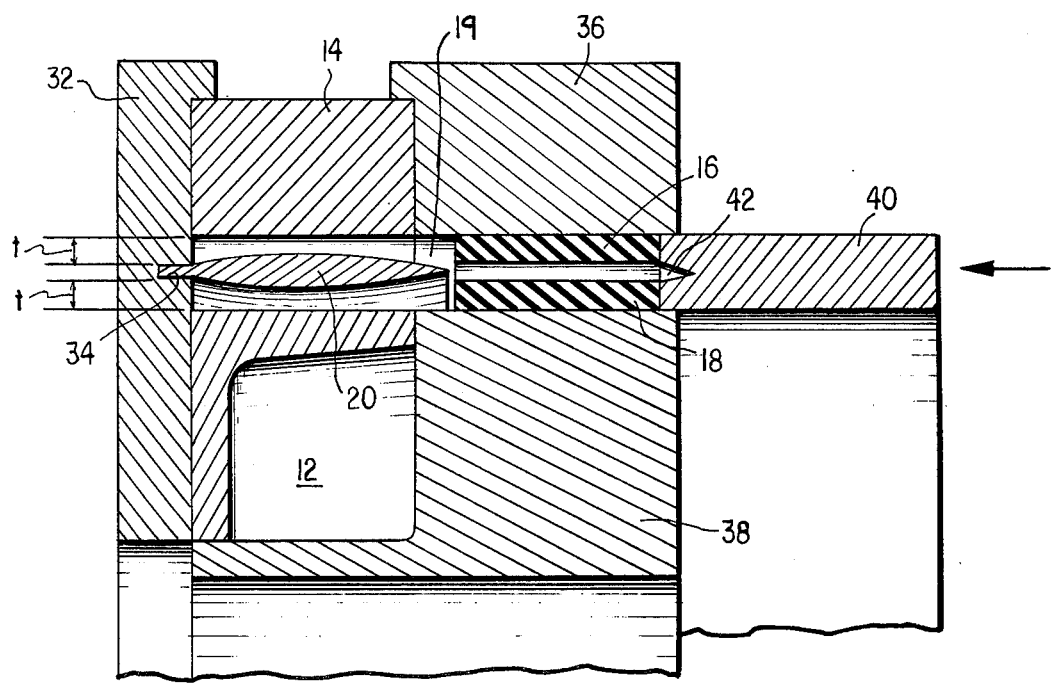
FIG. 2

FIG. 7
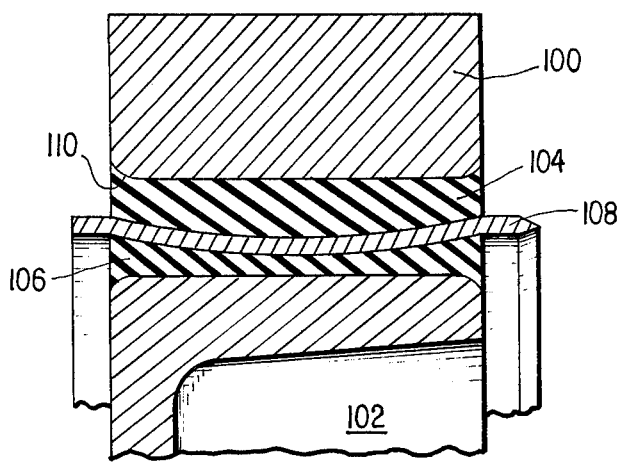
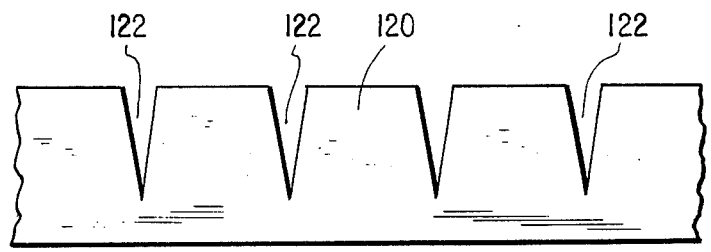
FIG. 8
FIG. 9
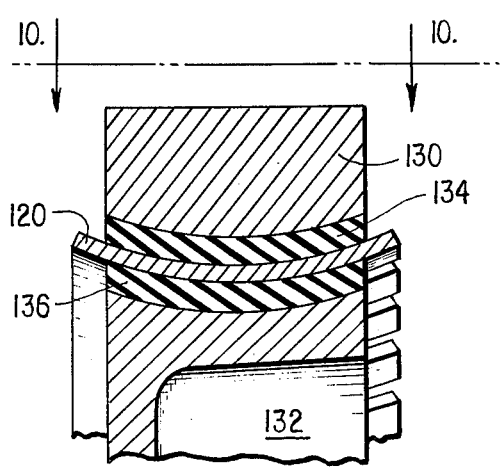
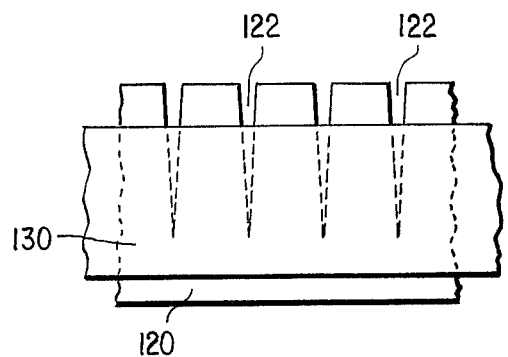
FIG. 10

TORSIONAL VIBRATION DAMPER WITH INTERLEAF

This invention relates to torsional vibration dampers of the type employed in internal combustion engines. Such dampers find wide application in internal combustion engines for automobiles, as well as the diesel engines commonly employed in the trucking industry.

The crankshaft of an internal combustion engine is usually subject to torsional vibrations. Such vibrations arise from the sequential explosion of combustible gases in the several cylinders. After one cylinder has fired a certain length of time elapses before the firing of another cylinder. The application of forces of rotation to the crankshaft of an engine is accordingly not smooth and continuous. Only if the number of cylinders were nearly indefinitely increased would such torsional vibrations be substantially eliminated. While the crankshaft is turning at, for example, 3000 rpm, delivering power to the wheels of the vehicle, it is executing torsional oscillations of, for example, one-fourth of one degree at a frequency of 150–250 cycles per second. In certain cases, the natural frequency of torsional vibration of the crankshaft may coincide with a particular firing frequency of the cylinders of the engine with the result that resonance may occur. Such an action can cause appreciable strains in the crankshaft and lead ultimately to its fatigue failure.

For a long number of years, workers in this art have recognized this problem and have constructed a variety of devices to lessen such torsional vibrations. One common form of torsional vibration damper is that defined by a hub coupled to the crankshaft either directly or indirectly. The hub carries an elastomer element around its rim, and the elastomer element is, in turn, coupled to an outermost annular member. This outermost annular member is often termed the inertia member. In the case of torsional vibrations, the hub executes such vibrations in phase with the crankshaft because it is rigidly coupled to it. The inertia member is coupled to the hub by the elastomer and accordingly there is a phase lag between the oscillations of the hub and the corresponding oscillations of the inertia member. In the case of an ideal vibration damper of this type, the energy of the torsional vibrations would be transferred into heat in the elastomer member and thereby dissipated. The heat arises in the elastomer member by virtue of internal friction within it. This is caused by the phase difference between the inertia member and the hub member, with these members stretching or deforming the elastomer due to their non-synchronism of oscillation.

In the construction and use of this type of torsional vibration damper, it has been known that the heat generated in the elastomer by virtue of such internal friction may be dissipated by the use of an element which is termed an interleaf. Such an interleaf element is disclosed in for example, U.S. Pat. Nos. 2,882,747, 3,041,889 and 3,058,371, all issued to Haushalter. An interleaf may be described as a relatively thin strip of metal bent into the shape of a hoop or annulus. The interleaf extends into the space between the inertia member and the hub and thus divides the elastomer into generally two radially spaced annular portions. The interleaf may be annularly continuous while the elastomer is annularly discontinuous or, the elastomer may be continuous annularly while a plurality of interleaf elements could be employed. The interleaf is generally of metal and is accordingly a relatively good conductor of heat and extending it axially beyond the elastomer there is a transfer of heat between the elastomer to the interleaf and from the interleaf to the ambient air.

In torsional vibration dampers of the general type having a hub, an outer inertia member and an elastomer member joining these two elements, the problem of axial displacement of the inertia member relative to the hub has occured. Due to vibrational forces of several kinds the inertia element may tend to move axially relative to the hub and thereby place undesired additional deformations on the elastomer. Such undesired axial slip has also engaged the attention of workers in this art. One solution is illustrated by U.S. Pat. No. 2,972,904 issued to Troyer. There, the radially facing surfaces of both the hub and of the inertia member are curved in a complementary manner so as to inhibit axial motion of the inertia member relative to the hub. Another problem encoutered is that of the elastomer slipping out from between the inertia and hub members.

According to the practice of this invention, an interleaf member is employed in a torsional vibration damper construction wherein the interleaf performs the dual function of conducting heat away from the elastomer and of inhibiting axial movement of the inertia member relative to the hub. Elastomer slippage is also inhibited. In carrying out the invention in one embodiment, the interleaf is thicker at its middle portion than at its ends. The elastomer members which sandwich the interleaf are radially deformed so that the elastomer portions adjacent the central interleaf portion are deformed a greater amount than the elastomer portions adjacent the axial ends of the interleaf. According to another embodiment of the invention, an interleaf thinner at its mid portion than at its axially extending ends is employed, with the two elastomer members which sandwich the interleaf undergoing maximum radial deformation at their axial ends. By virtue of this mode of construction, axial motion of the inertia member relative to the hub causes increased deformation of the elastomer with corresponding increase in resistance to such axial motion.

In another embodiment, similar to the Troyer configuration of U.S. Pat. No. 2,972,904, an interleaf is positioned in the elastomer wherein the interleaf follows the contour of the opposed radial faces of the inertia member and the hub to thereby increase resistance to axial motion of the inertia member relative to the hub.

According to yet another embodiment, the interleaf is of uniform radial thickness throughout its axial extent in the elastomer. The interleaf may be a simple arc in cross section or it may be wave-shaped in cross section. In either of these two configurations, the action is the same, namely, that axial motion of the inertia member relative to the hub is resisted by causing an increase in an already existing deformation of the elastomer.

IN THE DRAWINGS

FIG. 1 is a partial longitudinal cross section and illustrates a torsional vibrator damper of this invention according to a first embodiment.

FIGS. 2 and 3 illustrate a method of assembly.

FIGS. 6 and 7 illustrate third and fourth embodiments, respectively.

FIGS. 8, 9 and 10 illustrate a modification of the metallic interleaf of the embodiments of FIGS. 6 and 7.

Figure 4:
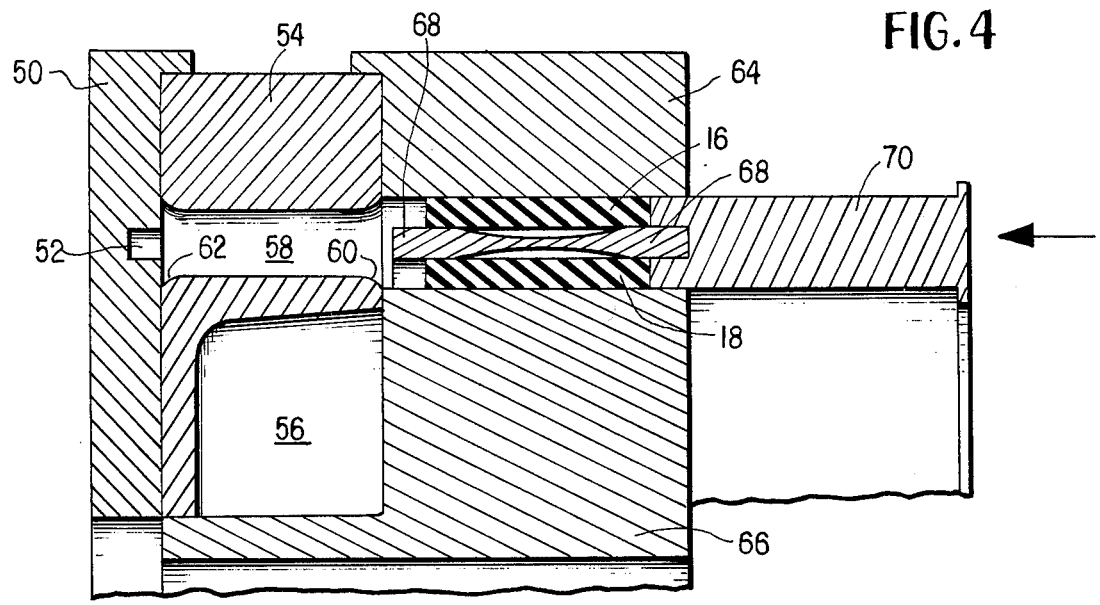
FIGS. 4 and 5 illustrate a mode of assembly of a second embodiment.

Referring now to FIG. 1 of the drawings, the numeral 10 denotes generally the torsional vibration damper according to one embodiment of this invention. A hub member 12 having an aperture 13 is customarily formed of metal and is adapted to be secured to a shaft passing through aperture 13 by suitable shaft coupling. The numeral 14 denotes an outermost annular element, also commonly formed of metal such as iron, coupled to the hub through a pair of annular elastomer members 16 and 18. A metal interleaf member having a thickened central portion 20 is in the general form of a hoop or annulus and has a thinned portion 22 at one axial portion which terminates in a projection 24. It has a thin rim portion 26 projecting axially in the other direction. The central elastomer portions of the members 16 and 18 are deformed in a radial direction by the thickened portion 20 of the metal interleaf. The axial ends of the elastomer members 16 and 18 are accordingly under less radial deformation and in the embodiment shown are not radially compressed.

The operation of the torsional damper illustrated at FIG. 1 is well-known, and accordingly only the briefest description will be given. The crank shaft which is subject to torsional vibrations and which is coupled to hub 12 is rotating and, simultaneously, executing torsional vibrations. With rotation of hub 12, inertia member 14 also rotates but, because of the elastic connection between the hub and inertia member does not oscillate in phase. Elastomer members 16 and 18 are accordingly subject to internal friction and heat is generated therein. At least a portion of the heat is transferred to the interleaf member for dissipation by means of contact of the axial ends of the interleaf with ambient air.

Any external forces acting on inertia member 14 to move it axially with respect to hub 12 are resisted by the elastomer members 16 and 18. This resistance to such relative axial motion arises from the resistance of the elastomer to shearing forces on the convex faces of the interleaf. For example, motion of inertia member 14 towards the right as viewed at FIG, 1 would be resisted by the elastomer at the left portion of FIG. 1 bearing against the ever-increasing radius of the interleaf with such continued axial movement. As known to workers in this art, the elastomer elements 16 and 18 may be adhesively bonded to, respectively, inertia member 14 and hub 12. Or, forces arising soley from their radial deformation may secure them in place. Similarly, there may be a bond between the surfaces of the interleaf and the elastomer. Bonding adhesives and techniques are well-known to workers in the art and form no part of the invention and accordingly are not described here.

Reference now to FIGS. 2 and 3 of the drawings illustrates a mode of assembly of the embodiment shown in FIG. 1. Referring now to FIG. 2, a fixture or jig 32 in the general form of a plate having an annular recess 34 and at least a flat face on the right portion thereof receives the left portion of the hub and inertia member, as illustrated. The interleaf is held in the fixture 32 by a close fit between the left portion 24 of the interleaf and the complementary groove 34 in the fixture 32. The other axial face of what will become the torsional vibration damper is clamped by other fixture members 36 and 38 which are so configured as to exhibit an annular cavity 19 which receives elastomer members 16 and 18 as indicated. A movable fixture or mandrel 40 is provided with an annular groove 42 having a shape complementary to the right-hand rim 26 of the interleaf. With the elements positioned as shown at FIG. 2, a suitable lubricant may be applied to facilitate the sliding of the elements now to be described. The nature and manner of application of such lubricants, if desired, are well-known to workers in this art and accordingly are not described here.

Reference now to FIG. 3 shows that the mandrel 40 has been moved to the left from the position shown at FIG. 2. Such motion forces the elastomer elements 16 and 18 to the left until the left edges of the elastomer elements about the face of fixture 32, the elastomer elements now filling the annular cavities between the hub 12 and inertia member 14. The fixtures 32, 36, 38 and mandrel 40 are now removed and the result is the torsional vibration damper shown at FIG. 1.

The amount of radial deformation (recalling that an elastomer cannot be compressed, only deformed) is clearly dependent upon both the original radial thickness of the elastomer elements 16 and 18 and the distance between the facing surfaces of the interleaf and the hub and inertia member radial faces. In a preferred embodiment, the initial radial thickness of elastomer members 16 and 18 at their axial ends is the same as their final radial thickness after deformation, as is shown at FIG. 2. Thus, in the assemblied condition, the axial ends of the elastomer members are not deformed. The deformation of the elastomer members in passing from the stage illustrated at FIG. 2 to the final assembly stage illustrated at FIG. 3 will cause them to expand along an axial direction and the reader may verify that the axial length of these elastomer members prior to assembly is less than subsequent to assembly by observing their difference in length in the drawings.

Figure 5:
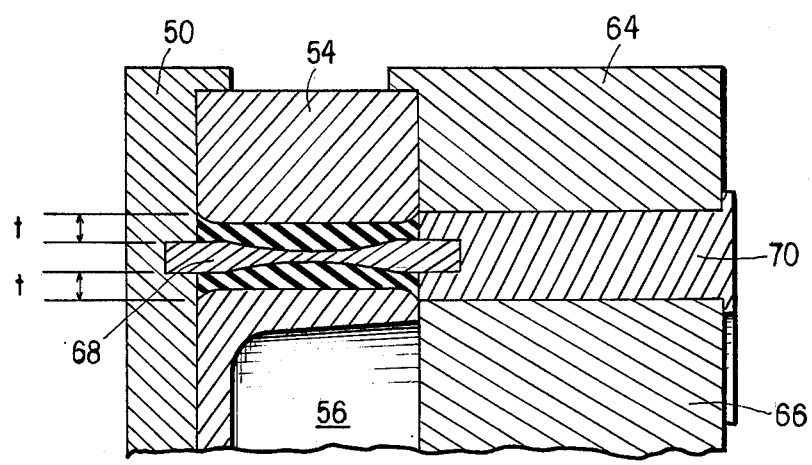

Reference now to FIGS. 4 and 5 shows an embodiment employing the same general principles but exhibiting a different configuration of the interleaf member. At FIG. 4, the numeral 50 denotes a fixture 50 having at least a plain right face which is provided with an annular groove 52. The numeral 54 denotes an inertia member, similar to inertia member 14, while numeral 56 denotes a corresponding hub which, again, is adapted to be coupled to the crankshaft of an internal combustion engine subject to torsional oscillations during rotation. A continuous circumferential space 58 is thus defined between the hub and the inertia member, with both axial faces of the space 58 being chamfered as indicated by the numerals 60 and 62. It will be understood that the inertia member 54 is identically chamfered. The numeral 64 denotes a fixture which along with another fixture 66 functions to engage the right face of what will become a torsional vibration damper which includes members 54 and 56.

The numeral 68 denotes a metal interleaf in the form of a hoop having a thin central portion and two axial portions of equal thickness. The numeral 70 denotes another fixture or mandrel element and is movable in a direction from right to left as indicated by the arrow. The left face of mandrel 70 has a complementary annular recess which receives the right axial portion of interleaf 68. With the elements positioned as shown at FIG. 4, mandrel 70 is now moved so that the elastomer elements 16 and 18, along with the interleaf 68, move into annular zone 58. Again, if desired, lubricants known to workers in this art may be employed and additionally a binding adhesive may be employed, all of which are known in this art. At the conclusion of the process, the final configuration of the damper is shown at FIG. 5 and it is only necessary to remove the fixture and mandrel elements. The device thus formed is a torsional vibration damper, similar to that of FIG. 1, except that the elastomer members 16 and 18 are deformed their maximum amount just axially interiorly of both axial faces. At the flush axial faces, the elastomer is not deformed, because the distance shown at FIG. 5 is the same as the radial thickness of the elastomer members 16 and 18 as shown at FIG. 4 prior to deformation. The central portion of the elastomer discs is, similarly, not deformed but may be by making the thinned central portion somewhat thicker.

The mode of operation of the completed torsional vibration damper indicated at FIG. 5 is the same as that described with respect to FIG. 1. Namely, upon torsional oscillation of hub 56 inertia member 54 oscillates (while rotating) out of phase with hub 56, thereby generating heat within the elastomer members. The resultant internal frictional heat is at least partially dissipated by conduction from the elastomer to the metal interleaf 68 and thence to ambient air through the axially projecting surfaces of the interleaf. Again, axial motion of the inertia member relative to its hub is resisted by the elastomer in an obvious manner.

Figure 6:
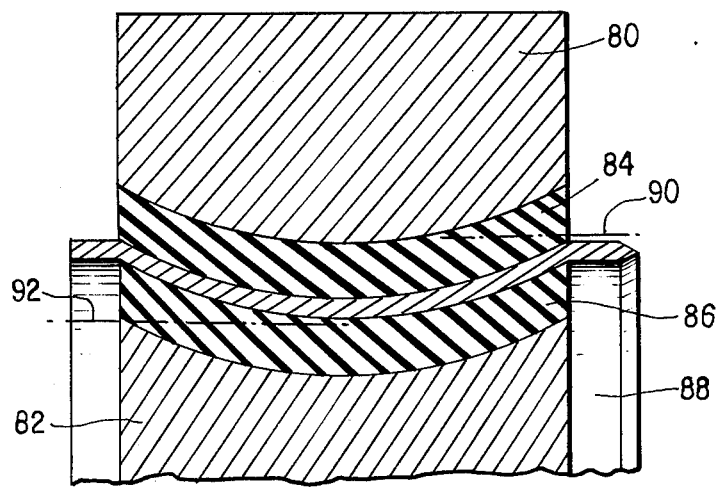

Referring now to FIG. 6 of the drawings, an embodiment is illustrated wherein the configuration of the torsional vibration damper is similar to that shown at U.S. Pat. No. 2,972,904 issued to Troyer. The numeral 80 denotes an inertia member coupled to hub element 82 and the latter adapted to be connected to the crankshaft of an internal combustion engine. Numeral 84 denotes an outermost annular elastomer member while the numeral 86 denotes an innermost annular elastomer member. An interleaf is denoted by the numeral 88 and formed of metal. It will be observed that the interleaf extends axially beyond the axial faces of the hub and inertia member and of the elastomer elements. The thickness of the interleaf is substantially uniform throughout its axial extent and follows a curvature complementary that exhibited by the facing radial surfaces of the hub and inertia member. The manner of assembly is similar to that previously described.

In operation, the vibration damper shown at FIG. 6 functions in a manner similar to that previously described in damping torsional oscillations. The interleaf functions to both dissipate heat in the elastomer 84 and 86, and also to inhibit axial motion of the inertia member with respect to the hub. As indicated by dashed lines 90 and 92, any motion in an axial direction of the inertia member the hub is resisted by increased shearing forces in the region indicated by the lines 90, 92. It will be understood that the axes 90 and 92 designate imaginary right circular cylinders which define a region of increased shear upon such axial motion.

Referring now to FIG. 7 of the drawings, another embodiment is illustrated. This embodiment is similar to that of FIG. 6, except that the radial, facing surfaces of the inertia member and hub are plain, i.e., they form coaxial right-cylindrical surfaces. The annular region between them is as before filled with elastomer members here designated by numerals 104 and 106. A metal interleaf member 108 of shape similar to that shown in FIG. 6 is employed and is assembled in a known manner. If desired, the axial entrance to the annular space between the hub and inertia member may be chamfered, as indicated by the numeral 110.

The reader will now be in a position to recognize that interleaf 108 functions to conduct heat away from the elastomer members during operation of the device and at the same time serve as a compression lock against the axial motion of the inertia member and the hub. Any such motion is resisted by the curvature of the interleaf 108. Thus any axial motion of the inertia member will cause an increase in the radial deformation of the elastomer members. Such deformation is resisted by the elastomer.

Referring now to FIGS. 8, 9 and 10 of the drawings, a modification of the interleaf is illustrated. At FIG. 8 the numeral 120 denotes a metallic interleaf in its unrolled or flat condition and provided with a plurality of notches 122 which are equally spaced along one edge of the strip. The strip is transversely bowed and then rolled to form the hoop-shaped interleaf. Numeral 130, at FIG. 9, denotes an inertia member and numeral 132 denotes the hub member of a torsional vibration damper. As before, the hub 132 is adapted to be coupled to the crankshaft of an internal combustion engine. The numerals 134 and 136 denote annular elastomer members. The construction is generally similar to that illustrated at FIG. 6 of the drawings, except for the presence of notches 122. When a metallic strip (such as 120 of FIG. 8) is transversely bowed or curved, shown at FIG. 6 and 9, for example, there is a tendency for its axial edges to wrinkle or buckle. By empolying an interleaf having notches 122, however, the transverse cross-section (an arc) of the interleaf as shown at FIG. 9 may be obtained without such buckling. The edges of the notches move together somewhat, as may be seen by reference to FIG. 10 wherein the width of the notches 122 after rolling and bowing is less that that shown at FIG. 8 prior to rolling and bowing.

In each embodiment radial deformation of the elastomers during assembly of the dampers is utilized to maintain axial positioning among the inertia member, the elastomers, the interleaf, and the hub. Such radial deformation gives rise to friction forces in a generally axial direction which resist relative axial movement of these elements. If desired, such frictional forces may be increased by using bonding compositions, i.e., adhesives, on the several surfaces. At the present state of bonding technology for torsional vibration dampers of the type here described, it is not practical to rely on bonding adhesives alone to maintain axial alignment. The reader will recognize, however, that the novel interleaf configurations of this invention would also yield the same advantages as above described without the necessity of radial deformation during assembly should better bonding adhesive and technology evolve.

What is claimed is;

1. A torsional vibration damper of the type defined by a hub adapted to be rotatably coupled to the crankshaft of an internal combustion engine, the hub carrying on its outer periphery an inertia member coupled to it by elastomer, an annular interleaf within the elastomer to divide it into two annular elements which sandwich the interleaf, the outer radial surface of the hub and the inner radial surface of the inertia member each define a cylinder, the improvement comprising, the interleaf being of non-uniform cross-section to thereby radially deform the elastomer different amounts at different axial positions therealong.

2. The damper of claim 1 wherein said interleaf is of an axial extent greater than said elastomer.

3. The damper of claim 2 wherein the cross-section of said interleaf has a thickened central portion midway axially thereof.

4. The damper of claim 3 wherein the elastomer is of maximum radial deformation adjacent said thickened central portion of said interleaf and is of a lesser radial deformation axially of said thickened central interleaf portion.

5. The damper of claim 3 wherein the elastomer of both axial ends thereof is not radially deformed where it is flush with the axial faces of the inertia member and the hub.

6. The damper of claim 2 wherein the cross-section of said interleaf has a thinned central portion midway axially thereof.

7. The damper of claim 6 wherein the elastomer is of maximum radial deformation laterally of said thinned central interleaf portion and is of a lesser radial deformation at said thinned central interleaf portion.

8. The damper of claim 7 wherein the elastomer of the axial center of the said interleaf is not radially deformed.

9. A torsional vibration damper of the type defined by a hub adapted to be rotatably coupled to the crankshaft of an internal combustion engine, the hub carrying on its outer periphery an inertia member coupled to it by elastomer, an annular interleaf within the elastomer to divide it into two annular elements which sandwich the interleaf, the improvement comprising at least one of the radial distances between the inertia member inner surface and interleaf and the radial distances between the interleaf and the outer surface of the hub varying over the axial extent of the surface contact of the elastomer and the interleaf.

10. The damper of claim 9 where the inner surface of the inertia member and the outer surface of the hub are each cylindrical.

11. The damper of claim 10 where the interleaf is of uniform cross section throughout its axial extent.

12. A torsional vibration damper of the type defined by a hub adapted to be rotatably coupled to the crankshaft of an internal combustion engine, the hub carrying on its outer periphery an inertia member coupled to it by elastomer, the outer surface of the hub being curved, the inner surface of the inertia member being curved, said curved surfaces being complementary, the improvement comprising, an interleaf of uniform radial cross-section positioned in said elastomer and extending from one axial face thereof to the other axial face of the elastomer, said interleaf being parallel at all axial portions thereof with the complementary surfaces of the hub and the inertia member.

13. The damper of claim 12 wherein said interleaf is provided along one axial edge thereof with a plurality of notches which extend from said one axial edge axially toward the other axial edge a distance sufficient to inhibit buckling of said interleaf during assembly.

14. The torsional vibration damper of claim 2 wherein said interleaf is of metal, whereby at least a portion of the heat generated within the elastomer is transferred to the interleaf and thence to ambient.

15. The torsional vibration damper of claim 9 wherein said interleaf is of uniform radial thickness and is of metal and is of an axial extent greater than said elastomer, whereby heat generated within the elastomer is transferred to the interleaf and thence to ambient.

16. The torsional vibration damper of claim 12 wherein said interleaf is of metal, whereby heat generated within the elastomer is transferred to the interleaf and thence to ambient.

* * * * *